ELLIS DOTY & GEORGE W. MILTIMORE.
Improvement in Railway Car Axles.
No. 119,831.
Patented Oct. 10, 1871.
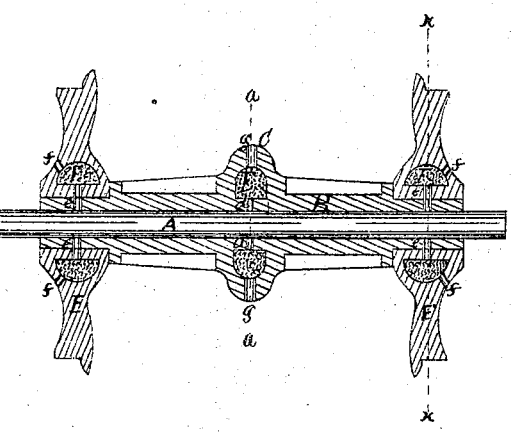
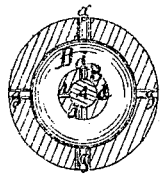
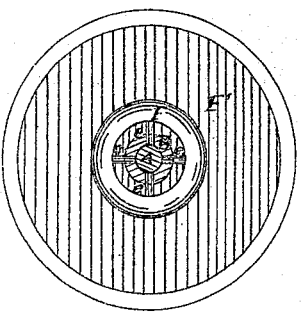

UNITED STATES PATENT OFFICE

ELLIS DOTY AND GEORGE W. MILTIMORE, OF JANESVILLE, WISCONSIN.

IMPROVEMENT IN RAILWAY-CAR AXLES.

Specification forming part of Letters Patent No. 119,831, dated October 10, 1871.

*To all whom it may concern:*

Be it known that we, ELLIS DOTY and GEORGE W. MILTIMORE, of Janesville, in the county of Rock and State of Wisconsin, have invented certain new and useful Improvements in Car-Axles and Wheels; and we do hereby declare the following to be a full, clear, and exact description thereof, which will enable others skilled in the art to which our invention appertains to make and use the same, reference being had to the accompanying drawing forming part of this specification, in which—

Figure 1 is a vertical longitudinal central section of the axle cutting the wheels through the center. Fig. 2 is a vertical transverse section of the axle taken on line $a\ a$ drawn across Fig. 1, and Fig. 3 is a vertical transverse section of the axle cutting the wheel through the center, showing those parts which are at the left-hand of the line $x\ x$ drawn across Fig. 1.

Similar letters of reference indicate like parts in the several figures of the drawing.

Our invention has for its object to provide a car-axle so arranged as to allow each wheel a separate and independent revolving movement, thereby facilitating the movement of the car in rounding a curve; and to that end consists in a hollow revolving axle, upon which are loosely mounted the wheels supporting the car, said axle being supported upon a fixed axle, and so arranged as to revolve thereon simultaneously with an independent revolving movement of the wheels; also, in the construction of said hollow axle and wheels whereby the same can be properly lubricated.

In the drawing, A represents a shaft or axle, which is permanently affixed to the truck of the car, and is made from steel or wrought-iron, as may be found most durable. B is a hollow axle, made of cast or wrought-iron, and is mounted upon the said axle A, and so arranged as to freely revolve thereon, and is enlarged at the center longitudinally, as shown at C, and provided within said enlarged portion with an annular chamber, D, which communicates with the hollow, receiving the fixed axle through openings $d\ d$. E and E' are the wheels supporting the car, which are mounted upon the outer ends of the axle B and so as to freely revolve thereon; said wheels are made from cast-iron in the usual manner, and each is provided at its center with an annular chamber, F, communicating with the axle through openings $e\ e$, as shown in Fig. 1. Each of said wheels is provided upon its outer side with openings $f\ f$, communicating with chamber F, and are so arranged as to admit of being firmly and securely closed by any suitable and known means. The enlarged portion of the axle B is also provided with openings $g\ g$, which communicate with chamber D, and are also so arranged as to admit of being firmly and securely closed. Within the said chambers F of the wheels, and D of the axle, we place or secure a sufficient amount of cotton or other waste, and then fill said chambers with oil, by which means the respective axles are properly lubricated, the oil from the waste passing through the several openings $d\ d\ e\ e$ to and in contact with the wearing surfaces of said axles. The outer end of the hub of each wheel is so formed as to bear against the boxes securing the fixed axle, (not shown,) by which means each wheel is secured in position upon the bearings of the revolving axle.

We do not wish to confine ourselves strictly to the chambers D of the revolving axle having the openings $d\ d$ communicating with the fixed axle, as said chamber may be so formed as to extend directly to the said axle.

When the wheels and axles of a railroad car are arranged as described and are moved in a straight line upon the track the said wheels and hollow axle revolve uniformly as one piece, as if solid; consequently there is no wear upon the journals between the wheels and hollow axle, as the journal between the hollow axle and stationary axle is smaller; the bearing thereof is consequently nearer the center. When the wheels move out of a straight line or in rounding a curve, each wheel has an independent movement upon the hollow axle, so as to admit of sufficient difference in the rotation of the wheels to gain the difference in the length of track, thereby reducing the friction of the moving car and avoiding dragging or slipping of one or both wheels upon the track the same distance, and the usual twisting strain upon the axle and consequent crystallization and destruction of the axle. By securing the oil within the chamber of the wheels and revolving axle, a greater quantity of lubricating material can be carried than is usual, and consequently the journals are less liable to run dry, and less time and attention are required thereto. By means of the lubricating as aforesaid, and the avoiding of the forward strain and pressure and consequent friction upon the journals sufficient to slide the wheel upon the track when rounding a curve, and the avoiding of the usual lateral friction upon the boxes consequent upon the lateral motion of the car, and throwing such friction upon the hubs of the wheels and car-frame, which rests upon the stationary axle outside of the car-wheels, hot and burning boxes, and consequent loss of property and of life, are entirely avoided.

Having thus described the nature and object of our invention, what we claim as new, and desire to secure by Letters Patent, is—

1. The combination of the fixed axle A, the hollow and revolving axle B, and wheels E E' loosely mounted thereon, substantially as and for the purpose described.

2. The combination of the fixed axle A, the hollow axle B, chamber D communicating with the fixed axle A, wheels E E', and chambers F communicating with the bearings of axle B, substantially as and for the purpose described.

The foregoing specification signed by us this 26th day of May, A. D. 1871.

ELLIS DOTY.
GEO. W. MILTIMORE.

Witnesses:
N. C. GRIDLEY,
N. H. SHERBURNE. (122)